United States Patent [19]

Frister

[11] Patent Number: 5,293,089
[45] Date of Patent: Mar. 8, 1994

[54] LIQUID-COOLED ELECTRIC GENERATOR

[75] Inventor: Manfred Frister, Schwieberdingen, Fed. Rep. of Germany

[73] Assignee: Robert Bosch GmbH, Stuttgart, Fed. Rep. of Germany

[21] Appl. No.: 849,407

[22] PCT Filed: Nov. 14, 1990

[86] PCT No.: PCT/DE90/00871

§ 371 Date: Apr. 22, 1992

§ 102(e) Date: Apr. 22, 1992

[87] PCT Pub. No.: WO91/09445

PCT Pub. Date: Jun. 27, 1991

[30] Foreign Application Priority Data

Dec. 15, 1989 [DE] Fed. Rep. of Germany ....... 3941474

[51] Int. Cl.$^5$ .................. H02K 9/19; H02K 5/18; H02K 5/20; H02K 16/00
[52] U.S. Cl. .................. 310/54; 310/89; 310/114; 310/64
[58] Field of Search .......... 310/54, 58, 59, 64, 310/65, 90, 112, 114, 263, 68 D, 89; 123/41.31, 52 M, 52 MC, 198 D, 198 E, 635

[56] References Cited

U.S. PATENT DOCUMENTS

| | | | |
|---|---|---|---|
| 2,107,481 | 2/1938 | Johnson | 310/54 |
| 2,862,119 | 11/1958 | Else et al. | 310/54 |
| 3,396,324 | 8/1968 | Karlsson et al. | 310/68 R |
| 3,525,001 | 8/1970 | Erickson | 310/54 |
| 3,571,639 | 3/1971 | Tiltins | 310/112 |
| 3,591,816 | 7/1971 | Sakamoto et al. | 310/58 |
| 4,164,660 | 8/1979 | Palazzetti | 310/54 |
| 4,262,224 | 4/1981 | Kofink et al. | 310/54 |
| 4,429,924 | 2/1984 | Franz et al. | 310/90 |
| 4,486,677 | 12/1984 | Yamamoto et al. | 310/64 |
| 4,780,659 | 10/1988 | Bansal et al. | 310/114 |
| 4,818,906 | 4/1989 | Kitamura et al. | 310/54 |
| 4,870,307 | 9/1989 | Kitamura | 310/54 |
| 4,922,148 | 5/1990 | Kitamura | 310/54 |
| 4,955,944 | 9/1990 | Aso et al. | 310/54 |
| 4,963,776 | 10/1990 | Kitimura | 310/64 |
| 4,980,588 | 12/1990 | Ogawa | 310/54 |
| 5,040,493 | 8/1991 | Gajewski et al. | 310/54 |
| 5,078,627 | 1/1992 | Anderson | 123/198 D |
| 5,134,328 | 7/1992 | Johnatakis et al. | 310/54 |
| 5,177,388 | 1/1993 | Hotta et al. | 310/114 |

FOREIGN PATENT DOCUMENTS

| | | |
|---|---|---|
| 1167591 | 4/1964 | Fed. Rep. of Germany . |
| 1438626 | 10/1968 | Fed. Rep. of Germany . |
| 1900025 | 8/1970 | Fed. Rep. of Germany . |
| 3038444 | 5/1982 | Fed. Rep. of Germany . |
| 3128081 | 11/1982 | Fed. Rep. of Germany . |
| 3129817 | 2/1983 | Fed. Rep. of Germany . |
| 3135901 | 3/1983 | Fed. Rep. of Germany . |
| 3207605 | 9/1983 | Fed. Rep. of Germany . |
| 1364058 | 12/1964 | France . |
| 2510319 | 1/1983 | France . |
| 2512600 | 3/1983 | France . |
| 11266 | 9/1981 | Japan . |
| 04052 | 3/1982 | Japan ............... 310/68 D |

OTHER PUBLICATIONS

"Elektrische Maschinen", Richter, vol. 1, Birkhauser-Verlag 1967, pp. 295-307.
Patent Abstracts of Japan: No. 25, 1981, vol. 5, No. 186 (E-84) (858).

Primary Examiner—Steven L. Stephan
Assistant Examiner—C. LaBalle
Attorney, Agent, or Firm—Michael J. Striker

[57] ABSTRACT

In a liquid-cooled electric generator, in particular a three-phase generator for motor vehicles and the like, having a rotor, a stator and a housing which accommodates the latter two and forms the bearing for the rotor shaft, as well as a device for liquid cooling (oil or water cooling) having a cooling jacket for a cooling liquid, the cooling jacket, on the one hand, is bounded by the closed external surface of the generator housing and, on the other hand, by a part, which has an accommodating cavity, of an engine block or gear block or similar unit to which the generator is attached and in which it is inserted.

22 Claims, 4 Drawing Sheets

LIQUID-COOLED ELECTRIC GENERATOR

BACKGROUND OF THE INVENTION

The invention relates to a liquid-cooled electric generator for a motor vehicle, especially for a motor cycle, bus, train or the like.

An electric generator of this type is known, comprising a rotor with a rotor shaft, a stator, a housing which has bearings for the rotor shaft and in which the stator and the rotor are mounted and a liquid cooling device and having a cooling jacket for cooling liquid.

The liquid cooling of electric, to be precise highly loaded, generators, in particular in the field of motor vehicles. Various types of cooling are used in these electric generators including manifold cooling, so-called jacket cooling, spray-oil cooling or in the form of direct conductor cooling. A list of possible types of ventilation for electric machines can be found in the book "Elektrische Maschinen" [Electric Machines], vol 1, Richter, Birkhäuser-Verlag, 1967, pages 295-307. It is also known in an oil-cooled generator (German Patent 3,038,444) to mount the field winding on the internal pole of the generator with the aid of a winding support and to construct the winding support on its bore surrounding the internal pole with ribs in order to form ducts guiding a cooling oil flow between the winding support and the internal pole.

In a further known liquid-cooled heating generator (German Offenlegungsschrift 3,129,817), the stator of a heating generator operating according to the induction principle, in particular for heavy goods vehicles, has a plurality of armature bars which are arranged distributed in the circumferential direction, are connected by short-circuiting rings on both sides of the stator lamination, and through which a liquid heat carrier flows.

It is also known to use the dissipated power of a motor vehicle generator for heating purposes (German Offenlegungsschrift 3,128,081), there being provided in the region of the stator and the bearing brackets cooling ducts for a liquid, which form a cooling jacket and are connected to the coolant circuit of the motor vehicle driving the generator. In this case, an additional heating generator can also be driven by the same shaft of the motor vehicle generator.

A similar solution is described in German Offenlegungsschrift 3,207,605. In this apparatus a cooling air circulation which sweeps over the winding and the rotor is maintained in the housing of the generator and a part of the housing forms heat-exchanging elements around which the cooling air circulation flows. The heat exchanging elements have an inlet and an outlet for a cooling liquid circuit located outside the bearing housing.

Finally, it is known (German Offenlegungsschrift 3,135,901), in a three-phase generator to connect lubricating oil ducts to the two antifriction bearings of the rotor shaft, the rotor shaft containing a central longitudinal bore which in the vicinity of the drive-side antifriction bearing merges into at least one radial bore which opens into an annular space suitable for receiving lubricating oil. In this case, means are provided to simplify such an oil lubrication by connection to the lubricating oil circuit of an internal combustion engine, the oil discharge taking place via the drive-side bearing cover of the three-phase generator.

SUMMARY OF THE INVENTION

It is the object of the invention to construct a liquid-cooled generator according to the basic principle of jacket cooling in such a way as to produce a particularly effective cooling in conjunction with a simple and cost-effective design.

According to the invention, the liquid cooling means has a cooling jacket for a cooling liquid which is bounded by a closed external surface of the housing on one side and on the other side by a part of an engine block or gear block or similar unit of the motor vehicle on which the generator is mounted.

The electric generator according to the invention achieves the above object and has the advantage that despite the very effective jacket cooling realized by the invention it is possible to eliminate the double-walled construction of the generator housing, so that substantial savings in terms of weight and cost are achieved, but the cooling is nevertheless particularly effective since the generator according to the invention uses a part of an engine block or of a comparable component in an internal combustion engine as the second and, as seen from the generator, so to speak external wall. The cooling liquid then is obtained directly as water cooling or oil cooling from the coo circuit of the part or unit on which the generator is mounted.

This further produces the advantage that there is no need for the presence of any special coolant connections which run the risk of becoming leaky, since the entire generator is accommodated with its single-walled liquid-tight housing by a recess or a niche of a part of the engine or gearbox, in a unit of the internal combustion engine, which is connected internally either to the coolant liquid circuit or else to the lubricating oil circuit of the internal combustion engine.

Furthermore, it is of decisive importance that, again, virtually no sealing problems are produced hereby, because the external generator housing can comprise a pot-shaped bearing bracket and a lid-shaped bearing bracket, the individual generator elements being contained in the pot shaped bearing bracket, while the A bearing bracket on the drive side then forms a cover whose radially projecting peripheral rim serves simultaneously to cover and mount the generator in the accommodating cavity of the part of the internal combustion engine. It is therefore sufficient to arrange in this area appropriate seals, O ring seals, for example, depending on the requirements and conditions which the internal combustion engine itself provides in its design and its corresponding contour.

The invention therefore enables effective coupling of the coolant circuit for the generator both to the engine cooling system and to the oil circuit of the internal combustion engine. It is also possible in the latter case for the bearing lubrication of the generator to be coupled in a simple way to the engine oil circuit.

Furthermore, a good to excellent noise suppression of the electric generator is achieved, since it is possible to eliminate dedicated fan impellers, which normally operate noisily, and the generator is, moreover, also accommodated in a noise-suppressed fashion in the accommodating cavity of the internal combustion engine.

Finally, apart from the substantial saving in terms of weight and cost because of the jacket cooling of the invention, a particularly good heat flow occurs from the areas which directly develop corresponding operational heat, that is the winding overhangs, bearings and the field winding by suitable heat transfer media in the form of thermally conductive materials to the generator housing, around which coolant directly flows.

Advantageous developments and improvements of the liquid-cooled electric generator in various embodiments of the invention. The generator can advantageously contain either two or more systems on one rotor shaft. As a result not only does the moment of inertia of the rotor become smaller, so that for an embodiment of the same power it is possible to build smaller with only a single system, but the possibility is also produced of higher driving speeds, that is to say a correspondingly intensive use of the system or systems provided.

In this case, in a multiple system arrangement it is possible in addition to a parallel connection of the systems also to have a series connection, so that a three-wire vehicle electrical system can be supplied, for example.

It is possible with particular advantage in this case to use conducting-piece rotor systems with a stationary field winding, so that brushes and slip rings are completely eliminated and from this point of view alone a long service life is ensured which can be further improved by the possibility, already mentioned above, of simultaneously connecting the bearing lubrication to the lubricating system of the internal combustion engine.

It is possible, furthermore, for rectifiers and controllers both to be built into the single-walled housing of the generator or to be built remotely at a separate location. The rectifier system can be arranged, likewise water cooled, in a further niche or a corresponding cavity, through which coolant flows, of the internal combustion engine.

If, in addition, the DC sides are connected in parallel in multiple system arrangements, success is further achieved in avoiding equalising currents through asymmetries and in appreciably reducing the ripple of the output voltage as in the case of polyphase systems.

BRIEF DESCRIPTION OF THE DRAWING

Exemplary embodiments of the invention are represented in the drawing and are explained in more detail in the following description, wherein.

DETAILED DESCRIPTION OF THE PREFERRED EMBODIMENTS

The basic idea of the present invention is that a liquid-cooled generator even containing a plurality of systems and especially intended for the supply of vehicle electrical systems is subjected to a particularly effective jacket cooling by bounding the liquid jacket on the one side by the generator housing, which in addition can also have cooling ribs for better heat transfer, but on the other side by a part of a unit of the vehicle of the other movable unit to which the generator is assigned, especially by an accommodating cavity in the engine block or in the gear block of the drive unit.

Figure 1:
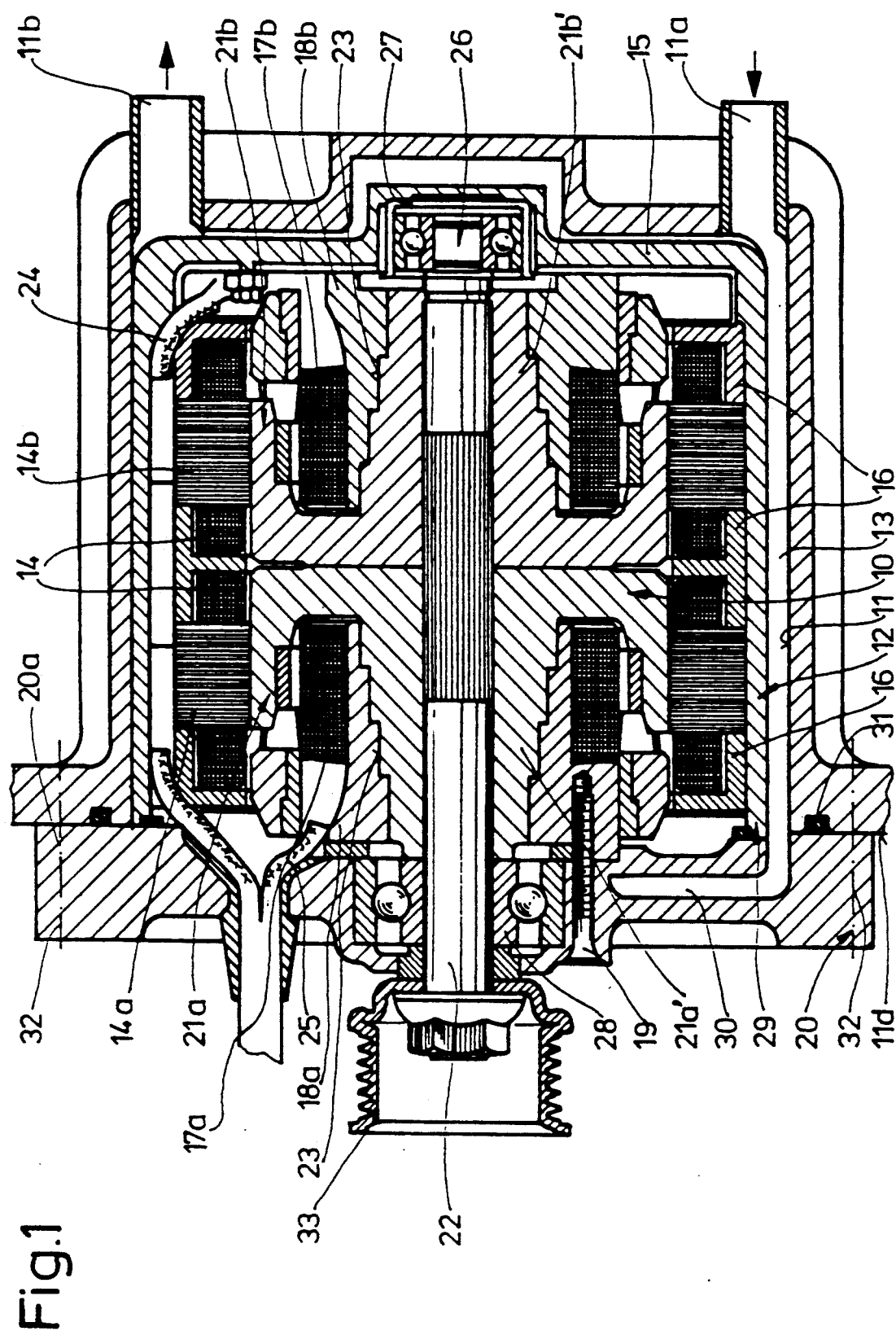
FIG. 1 shows a detailed cross-sectional representation of a liquid-cooled generator according to the invention, comprising in the present case two further systems as a special feature, in niche or in an accommodating cavity of an associated unit of an internal combustion engine or motor vehicle.

An exemplary embodiment of a liquid-cooled generator in the form of a double generator having two systems is represented in full in FIG. 1 and designated by 10. It is accommodated in a part P of a unit, preferably of the engine, which here especially follows the external shape of the housing of the generator, or alternatively in other parts of the internal combustion engine which are equipped suitably in this way. The part P accommodating the generator with its housing is designated below as accommodating cavity 11. The accommodating cavity 11 is connected via a coolant inlet 11a and a coolant outlet 11b to a suitable circuit, preferably of the internal combustion engine. This circuit can be the coolant circuit or, if necessary, also the lubricant circuit, in which case the generator is then oil-cooled.

The generator components are accommodated in a generator housing 12 which forms the external boundary for the water or oil cooling jacket 13 which circulates around the generator housing in the accommodating cavity 11 of the engine block. Nothing further is to be stated as regards the accommodating cavity or its special construction or arrangement in the region of the drive unit of a motor vehicle or the like, since this part is to be determined and constructed depending on the conditions. However, it is advantageous for the front boundary surface 11d of the accommodating cavity to be constructed flat, in any event in the region of a prescribed covering by a projecting flange on the generator housing, so that mounting the entire generator can be undertaken without difficulty by insertion into the accommodating cavity on the corresponding part P of the engine block B or gearbox G and flat external bearing surface.

The liquid-cooled generator is constructed as a double generator in the exemplary embodiment shown in FIG. 1 and comprises two generator systems with a double conducting-piece rotor.

The two stators 14a, 14b with their respective windings 14 are accommodated in the pot-shaped B bearing bracket forming the main part of the generator housing. It is possible, furthermore, to provide special thermally conducting pieces 16 in the vicinity of the inner surface of the B bearing bracket to ensure optimal heat transfer. In the double generator system constructed here without slip rings, the two field windings 17a and 17b are held in a stationary fashion and supported by correspondingly divided internal pole parts 18a, 18b which are themselves supported in a stationary fashion by generator housing parts. A screw 19 connects the internal pole part 18a to the A bearing bracket 20. The two-part conducting-piece rotor 21a, 21b is seated on the rotor shaft 22, the double spider 21a', 21b' of the double conducting-piece rotor being seated on the rotor shaft 22 over the entire internal length and forming with the internal pole 18a, 18b of the field windings a first internal air gap 23, extending here in the shape of a staircase. Consequently, there is a substantial improvement in the magnetic efficiency of the total system, since the air gap extends over the entire depth of the internal pole.

Further represented in FIG. 1 at 24 is the B-side field winding supply lead, which unites with the A-side field winding supply lead 25 and is led outwards together with it through a common bore in the A bearing bracket 20.

At the averted end, the pot-shaped B bearing bracket 15 has an indentation 27 accommodating the B-side bearing 26 of the rotor shaft 22, while the A-side bearing 28 is seated in a suitable accommodating bore of the A bearing bracket 20 which serves at the same time to mount the flange of the entire double generator. For this purpose, the A bearing bracket 20, which is constructed like a lid, is placed on the external annular rim of the pot of the B bearing bracket 15 and connected to the latter there with the interposition of suitable seals 29, there being no need to go into these in more detail to explain the invention.

In order to ensure adequate cooling in the region of the A-side rotor shaft bearing 28 as well, it is possible, furthermore, for a cooling duct 30, which is aligned with the liquid jacket between the generator housing and the accommodating cavity and is of arbitrary, including annular, shape to be provided in the A bearing bracket 20. Furthermore, the outer surface of the pot-shaped generator housing, that is to say the B bearing bracket 15, preferably has ribs of suitable shape and direction, so that not only is a better heat transfer produced hereby, but also a suitable guiding of the cooling liquid is ensured from the inlet 11a to the outlet 11b.

The external housing cover (A bearing bracket 20) which projects with its annular peripheral rim 20a over the clear opening of the accommodating cavity then serves to mount the liquid-cooled generator on an annular connecting surface 11d of the part P with the interposition of seals 31 and with the aid of corresponding screwing means, which are merely indicated at 32. The drive of the rotor shaft 22 is then performed by a suitable V-belt pulley 33, which is mounted in a suitable way on the rotor shaft stub penetrating the drive-side bearing bracket 20, but can also, if necessary, be performed from inside outwards, when the rotor shaft penetrates the bearing bracket 15, which is then on the A side, in a sealed fashion, and meshes by a pinion with a rotating machine element of the engine and gearbox.

Figure 2:
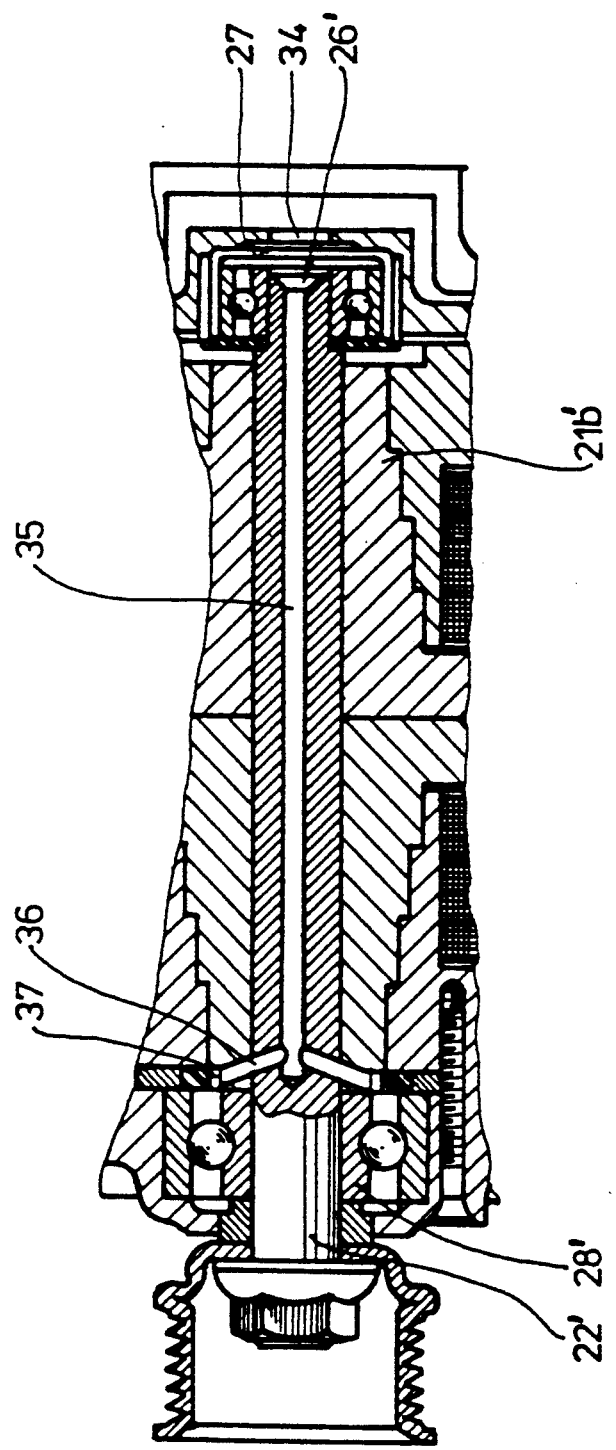
FIG. 2 is a detailed cross-sectional view of an embodiment of the liquid-cooled generator having bearing lubrication by coupling to a engine oil circuit in combination with liquid cooling.

It is possible to use both water and oil as the coolant in the cooling jacket, depending on the details of the corresponding machine unit, it being possible in the case of oil cooling for the simultaneous supply of the oil-lubricated bearing of the generator to be performed in a simplified way when in accordance with the representation of FIG. 2 the lubricating oil can further be supplied from the oil cooling jacket, which is in any case located between the generator housing and the accommodating cavity, through a corresponding oil inlet opening 34.

Shown in FIG. 2 only with limited detail is the possibility of supplying the generator bearing with oil, it being possible in principle for the supply of the lubricating oil to the two antifriction bearings supporting the rotor shaft to be performed as described in German Offenlegungsschrift 3,135,901 already mentioned further above. Thus, the entry of oil takes place at 34 in the region of the B-side antifriction bearing 26', the rotor shaft 22' containing a longitudinal bore 35 which can then merge in the vicinity of the drive-side antifriction bearing 28' into radial bores 36 which also supply the A-side antifriction bearing 28' with lubricating oil via an annular space 37 adjoining the bores. The discharge of oil then takes place via a radial bore 38 provided radially at the antifriction bearing 28' on the drive side.

Figure 3:
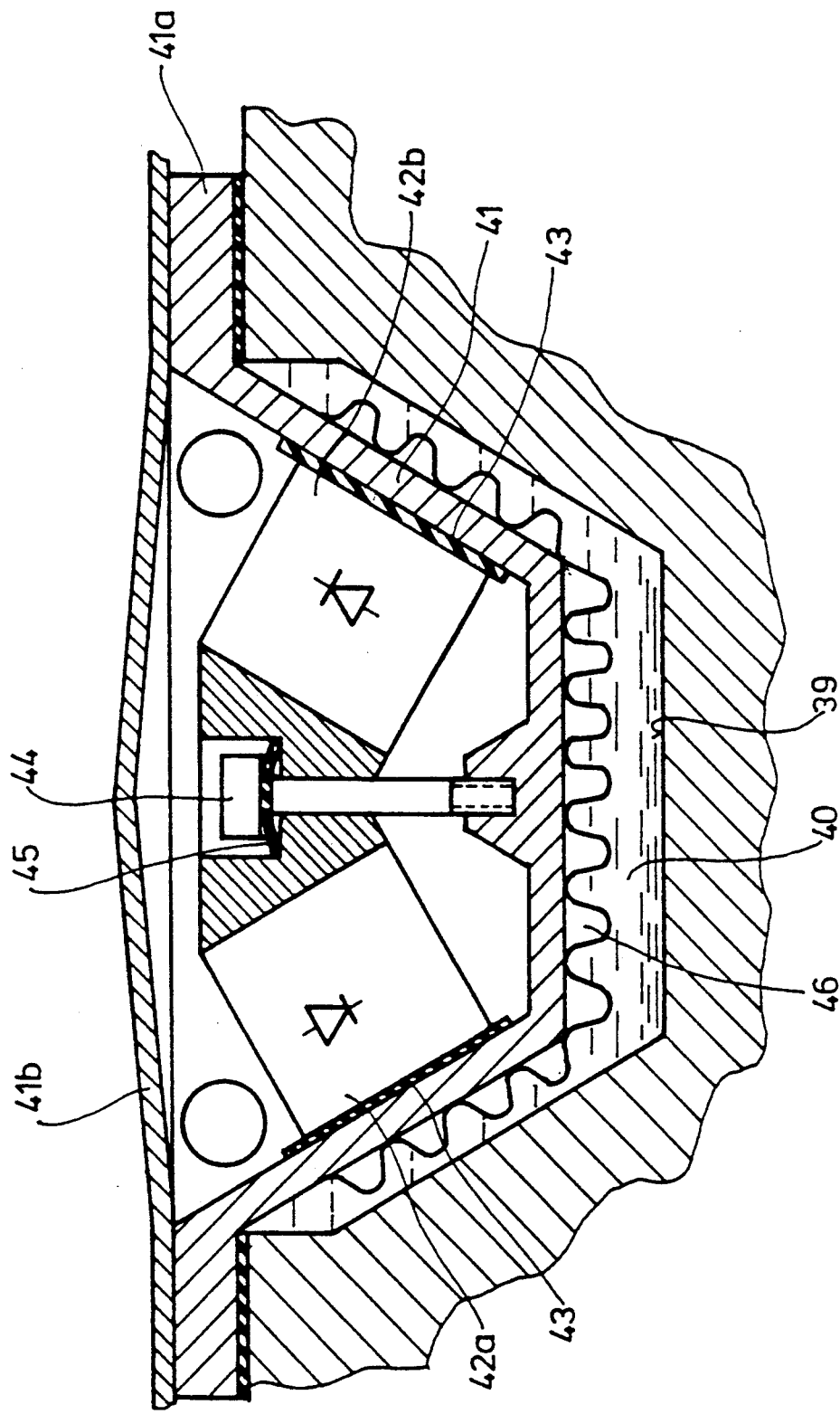
FIG. 3 is a cross-sectional view of a remotely built water-cooled rectifier which is likewise arranged in an accommodating cavity of a unit of an internal combustion engine.

A further advantage in the present invention is that it is certainly possible also to leave the highly loaded rectifier region inside the generator housing effectively cooled by a cooling jacket. It is also possible, however, to build the rectifier unit remotely and supply it to a separate water cooling, as shown in the representation of FIG. 3. The basic principle resembles the embodiment of FIG. 1 for the generator. Here, too, there is formed an accommodating cavity 39 of a suitable machine unit, for example internal combustion engine, and having corresponding connections to the coolant circuit, so that a water jacket 40 is produced into which the bearing part for the rectifier blocks, which is referred to below as cooling trough 41, dips and is correspondingly secured. The cooling trough 41 supports in a suitable way two rectifier blocks 42a, 42b, which can bear against the internal walls of the cooling trough 41 via an interposed insulating layer 43. The construction and shape of the rectifier blocks can be arbitrary. In the exemplary embodiment represented in FIG. 3 a common bearing part is provided which separates the individual diodes electrically from one another by suitable insulation and by a suitable central fastening. For example a fastening screw 44 with interposed compression spring 45, presses the two rectifier blocks 42a, 42b, which have the basic shape of a triangle, against the internal oblique walls of the cooling trough 41.

Figure 4:
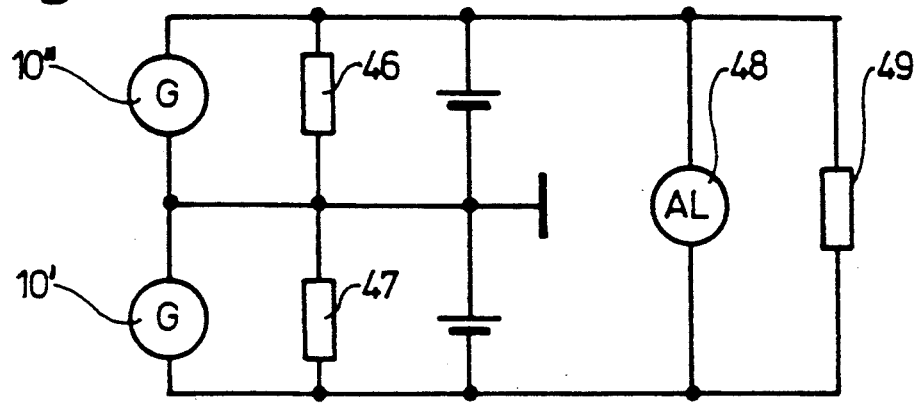
FIGS. 4 and 5 are circuit diagrams showing possible electrical interconnections in embodiments having multiple systems.

The cooling trough 41 can be continued right into an external flange region 41a, by means of which it is fastened together with a corresponding cover 41b to the external surface, adjoining the accommodating cavity 39, of the respective machine unit. On its external surface, the cooling trough 41 advantageously further has cooling ribs 46 of arbitrary shape and arrangement, so that a favorable heat transfer can be achieved. Since the arrangement of two or, if necessary, even more three-phase systems inside such a liquid-cooled generator is advantageous, the possibility exists in accordance with FIG. 4 of forming multiple-wire systems by corresponding series connection of the individual generator systems 10', 10" provided it is possible, for example, for the center terminal to be connected to frame. It is then possible to provide individual loads for the respective voltages delivered by the two generator systems 10', 10", and these are designated by 46 and 47 in FIG. 4. However, it is also possible for joint loads 48, 49 to be connected across the entire series circuit of the two generator systems 10', 10", so that the latter can be operated with higher voltages, for example in order to achieve a better defrosting effect on motor vehicle windows and the like. It is also possible to design the two generator systems for different voltages, so that, for example, the generator system 10' delivers a vehicle network voltage of the normal 12 V and the generator system 10" a vehicle network voltage of, for example, 24 V, so that a 12 V/24 V/36 V three-wire network can be realised overall.

Figure 5:
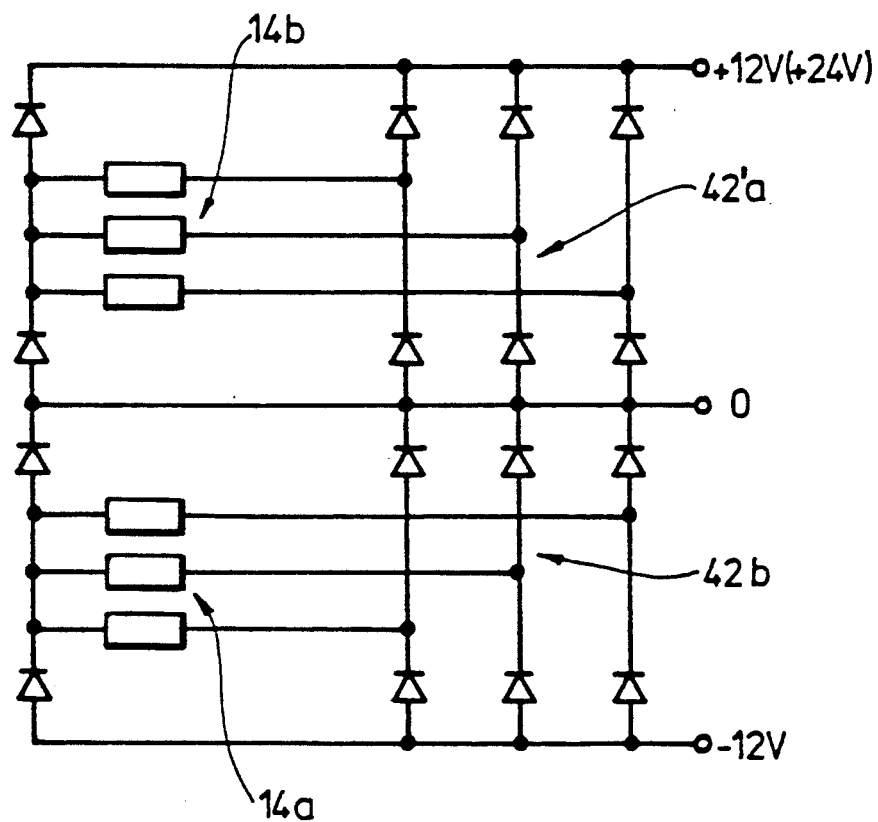

Shown highly diagrammatically in FIG. 5 is such a three-wire network supply having the individual stator windings 14a, 14b for the different network voltages, which operate on dedicated rectifier blocks 42a', 42b' which are connected in series and connect to frame at their tie point.

A further advantage of the present invention is possible in conjunction with elimination of the series connection of the at least two provided three-phase systems when the two three-phase systems are rotated electrically with respect to one another by 30°, either by appropriate manipulation in the stator region or on the rotor, so that given parallel connection (both systems must then deliver the same vehicle network voltage) it is possible to achieve a transition from a conventional 6-pulse rectifier system (three-phase full-wave rectification) to a 12-pulse rectifier system, and a decidedly better smoothed DC voltage is produced with the advantage of less interference. This can also be of considerable significance for voltage-sensitive loads, in particular.

It will be understood that each of the elements described above, or two or more together, may also find a useful application in other types of constructions differing from the types described above.

While the invention has been illustrated and described as embodied in a liquid-cooled electric generator, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

1. A liquid-cooled electric generator for a motor vehicle comprising a housing including two bearing brackets, each of the bearing brackets having a rotor shaft bearing, a rotor mounted on a rotor shaft in the housing with the rotor shaft engaged in the bearings, a stator in the housing, and liquid cooling means including a cooling jacket for a cooling liquid, the housing being received in a part of the motor vehicle which has an accommodating cavity so that the cooling jacket is formed between a closed external surface of the housing wall of the cooling jacket and the cavity of the part of the motor vehicle which forms an outer wall of the cooling jacket.

2. A liquid-cooled electric generator as defined in claim 1, wherein the part of the motor vehicle is an engine block.

3. A liquid-cooled electric generator as defined in claim 1, wherein the part of the motor vehicle is a gear block.

4. A liquid-cooled electric generator as defined in claim 1; and further comprising an inlet means to and an outlet means from the accommodating cavity for the cooling liquid.

5. A liquid-cooled electric generator as defined in claim 4, wherein one of the bearing brackets is pot-shaped and another of the bearing brackets is lid-shaped, the lid-shaped bearing bracket having a outer peripheral rim extending outwardly for mounting the housing on an annular connecting surface of the part adjacent to the accommodating cavity.

6. A liquid-cooled electric generator as defined in claim 5, further comprising seals on an annular end face of the pot-shaped bearing bracket located between the lid-shaped bearing bracket and the pot-shaped bearing bracket, and wherein the lid-shaped bearing bracket is provided with at least one duct opening to the cooling jacket and extending to the bearing located in the lid-shaped bearing bracket.

7. A liquid-cooled electric generator as defined in claim 5, further comprising additional seals between the outer peripheral rim and the annular connecting surface of the part.

8. A liquid-cooled electric generator as defined in claim 5, further comprising a plurality of ribs on an external surface of the pot-shaped bearing bracket for guiding the cooling liquid for heat transfer, the external surface being contacted by the cooling liquid when the cooling liquid flows through the cooling jacket.

9. A liquid-cooled electric generator as defined in claim 5, wherein the rotor shaft extends through the bearing in the lid-shaped bearing bracket, and further comprising a V-belt pulley for an external drive attached to a portion of the rotor shaft extending through the bearing in the lid-shaped bearing bracket.

10. A liquid-cooled electric generator as defined in claim 5, wherein the rotor shaft extends through the the pot-shaped bearing bracket in a sealed manner and meshes with a rotary driven part via a pinion.

11. A liquid-cooled electric generator as defined in claim 1, wherein the stator includes at least one laminated stator core applied directly to an inner wall of the housing and windings bearing against the inner wall via interposed heat conducting pieces for heat transfer.

12. A liquid-cooled electric generator as defined in claim 1, further comprising at least one additional rotor mounted on the rotor shaft and one additional stator for each of the additional rotors, each of said additional rotors and additional stators comprising an additional generator system.

13. A liquid-cooled electric generator as defined in claim 12, wherein the generator systems are three-phase, and further comprising means for connecting the generator systems in series in the housing in a three-wire network.

14. A liquid-cooled electric generator as defined in claim 12, wherein the generator systems are three-phase and further comprising means for connecting the generator systems in parallel in the housing in a three-wire network.

15. A liquid-cooled electric generator as defined in claim 14, wherein two of the generator systems reside side-by-side in the housing, and further comprising rotating electrically a three-phase system associated with each of the generator systems with respect to each other by 30° so that a highly smoothed 12-pulse output DC signal is formed during three-phase full-wave rectification.

16. A liquid-cooled electric generator as defined in claim 1, further comprising an additional rotor mounted on the rotor shaft and an additional stator for the additional rotor, said additional rotor and additional stator comprising an additional generator system, and the generator systems each are conducting-piece rotor sub-generators having fixed internal poles supporting field windings and a staircase-shaped internal air gap between a spider mounted on the rotor and the fixed internal poles with the field windings.

17. A liquid-cooled electric generator as defined in claim 1, further comprising means for connecting the cooling jacket and the two bearings to a lubricating oil circuit of the motor vehicle containing oil, so that the cooling jacket and the two bearings receive a portion of the oil from the lubricating oil circuit.

18. A liquid-cooled electric generator as defined in claim 17, further comprising means for conducting the oil from the bearing in the pot-shaped bearing bracket to the bearing in the lid-shaped bearing bracket including an axial bore provided in the rotor shaft, and wherein the axial bore is connected to an oil discharge bore via transverse ducts in the vicinity of the bearing in the lid-shaped bearing bracket.

19. A liquid-cooled electric generator as defined in claim 18, further comprising ring seals for the two bearings for sealing the means for conducting oil from an interior of the housing.

20. A liquid-cooled electric generator for a motor vehicle comprising a housing including two bearing brackets, each of the bearing brackets having a rotor shaft bearing, a rotor mounted on a rotor shaft in the housing with the rotor shaft engaged in the bearings, a stator in the housing, liquid cooling means including a cooling jacket provided for a cooling liquid and bounded by a closed external surface of the housing and by a part of a motor vehicle, the housing bearing attached to the part of the motor vehicle, a cooling trough and a rectifier unit mounted in the cooling trough, the rectifier and the cooling trough being located in an additional accommodating cavity of the part of the motor vehicle on which the housing is attached so that an additional cooling jacket is formed between the additional accommodating cavity and internal walls of the cooling trough.

21. A liquid-cooled electric generator as defined in claim 20, further comprising fastening means for the rectifying unit, and wherein the rectifying unit in the cooling trough comprises two rectifier blocks pressed by the fastening means against the internal walls of the cooling trough and the cooling trough has cooling ribs extending into the additional cooling jacket and a projecting external flange attached to an external surface of the additional accommodating cavity.

22. A liquid-cooled electric generator as defined in claim 21, further comprising sealing means between the projecting external flange of the cooling trough and the external surface of the additional accommodating cavity and a closing cover covering the cooling trough.

* * * * *